Figure 1:
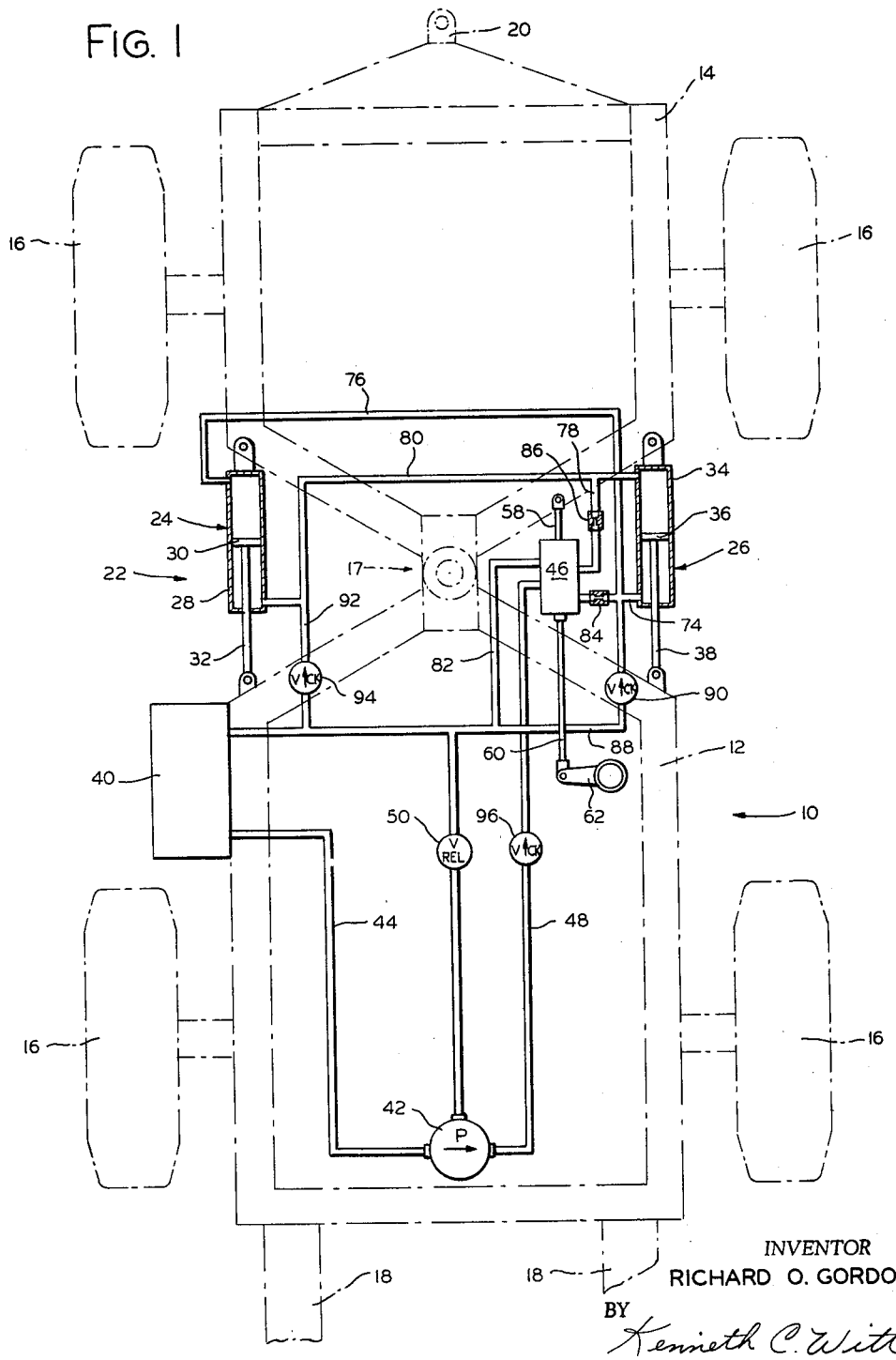

Dec. 1, 1964   R. O. GORDON   3,159,230
POWER STEERING SYSTEM FOR TOWABLE VEHICLES
Filed Feb. 14, 1962   3 Sheets-Sheet 1

INVENTOR
RICHARD O. GORDON
BY
Kenneth C. Witt
ATTORNEY

Dec. 1, 1964  R. O. GORDON  3,159,230
POWER STEERING SYSTEM FOR TOWABLE VEHICLES
Filed Feb. 14, 1962  3 Sheets-Sheet 2

INVENTOR
RICHARD O. GORDON
BY
Kenneth C. Witt
ATTORNEY

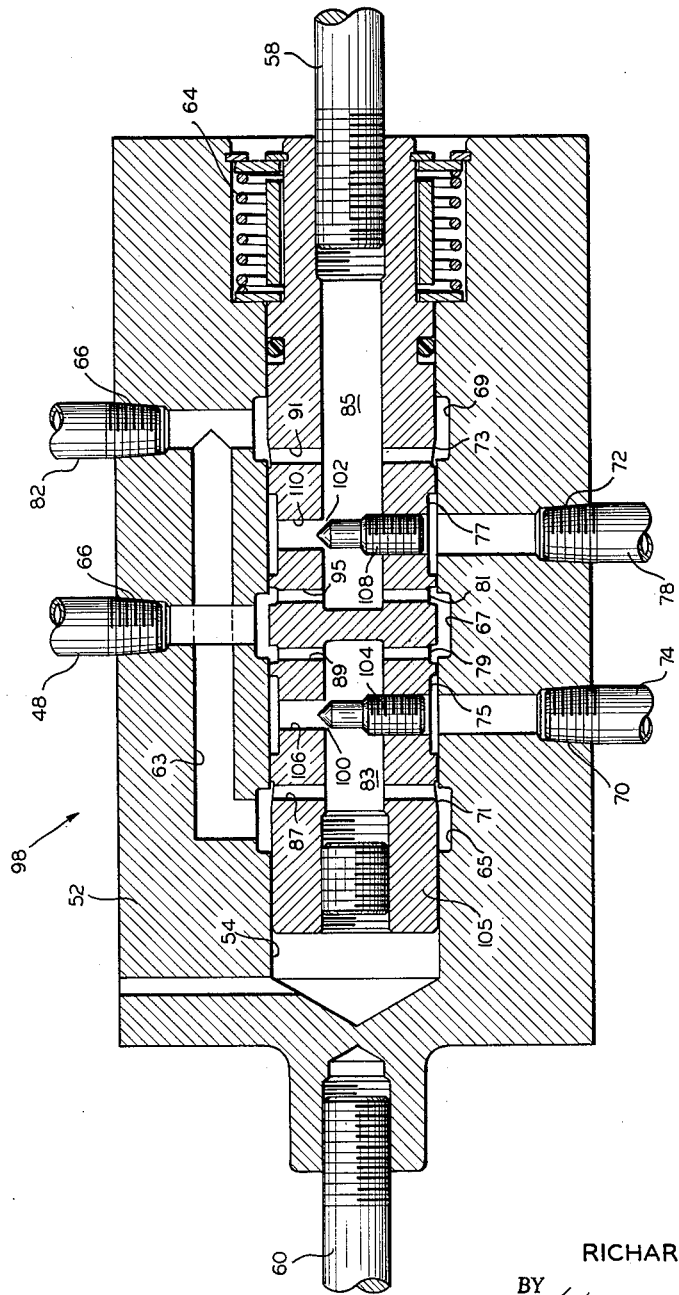

United States Patent Office 3,159,230
Patented Dec. 1, 1964

3,159,230
POWER STEERING SYSTEM FOR TOWABLE VEHICLES
Richard O. Gordon, New Buffalo, Mich., assignor to Clark Equipment Company, a corporation of Michigan
Filed Feb. 14, 1962, Ser. No. 173,245
9 Claims. (Cl. 180—79.2)

This invention relates to power steering systems, and more particularly to power steering systems used in conjunction with articulated vehicles that may be towed by other vehicles.

The use of fork lift trucks in the handling of materials has been known for many years. Until recent years such vehicles were restricted primarily to indoor use or use on paved or semi-paved areas immediately adjacent the plant or other buildings in which the fork lift trucks normally operated. With the advent of fork lift trucks that are suitable for rough terrain operation, such as the articulated rough terrain fork lift truck described and shown in copending patent application, Serial No. 630,-197, which is assigned to the assignee of the present invention, the use of lift trucks is no longer restricted to indoor areas or relatively smooth outdoor areas. Consequently, more and more use is being made of rough terrain fork lift trucks to deliver materials to construction sites and the like. In such an operation the materials to be delivered to the construction site are normally loaded on a flat bed truck, for example. The rough terrain fork lift truck then may be hitched to the flat bed truck and towed behind it at highway speeds to the construction site. At the construction site the fork lift truck is unhitched and used to unload the material from the flat bed truck and transport it to the desired location at the construction site which the flat bed truck may not be able to reach because of the rough terrain that is often encountered at such locations.

Normally there is no problem involved in towing a vehicle. However, in the case of an articulated vehicle, such as the aforementioned fork lift truck, having power steering it has been found that the vehicle under certain circumstances may oscillate violently during towing. Upon investigation it has been found that when the wheels of the towed vehicle hit a bump or other obstruction in the roadway, thus causing the vehicle to articulate slightly, fluid is forced out of one end of the power steering cylinders under relatively high pressure back to the fluid reservoir. As the vehicle straightens itself out fluid tends to be pulled back into the power cylinders. However, since the fluid is urged back into the power cylinders by the force of atmospheric pressure only, the fluid is not replaced in the power cylinders as fast as it is forced out by the articulation of the vehicle. Therefore, the power cylinders become partially emptied of fluid on both sides of the pistons after a few such oscillations. In this condition, the vehicle may begin to oscillate continuously during towing because as the towed vehicle is turned in one direction a vacuum is created in the power cylinders on one side of the pistons with the result that the steering mechanism turns the vehicle in the other direction, thus creating a vacuum on the other side of the piston. This action tends to be self-perpetuating and may result in violent oscillation of the towed vehicle which, of course, is extremely dangerous.

In order to overcome this problem there are several possibilities. First, the towed vehicle could be mechanically locked to prevent articulation; however, this is not feasible since it would result in undue tire wear due to scrubbing as the vehicle was towed around corners. Second, the articulation of the vehicle could be frictionally retarded. While this approach has some merit there are a number of disadvantages. For example, the operator must remember to frictionally retard the articulation of the vehicle prior to towing and to release such frictional retarding means prior to operation of the vehicle after towing. Further, it is difficult to apply the correct amount of pressure to frictionally retard the articulation of the vehicle sufficiently to prevent oscillation and yet allow the vehicle to articulate when turning a corner. Third, it is possible to allow the engine of the towed vehicle to idle during towing so that the pump is continuously supplying pressurized fluid to the power steering system with the result that the power cylinders are maintained filled with fluid at all times. However, while this will prevent oscillation of the vehicle during towing, it has the same disadvantage as the first method, that is, the power steering system will "fight" articulation as the vehicle is being towed around a corner so that there will be undue tire wear due to scrubbing as the vehicle is towed around corners.

Therefore, a principal object of my invention is to prevent unwanted oscillation of an articulated vehicle during towing and yet allow free articulation of the vehicle as it is towed around a corner.

Another object of my invention is to provide a power steering system in an articulated vehicle which automatically prevents undesirable oscillation of the vehicle during towing, and also permits the vehicle to articulate when being towed around a corner.

In carrying out my invention in a preferred embodiment I provide a power steering system for an articulated vehicle which includes a pair of double-acting piston and cylinder actuators connected between the pivotal portions of the articulated vehicle. Also included in the system are a reservoir and a pump connected to the reservoir. A four-way open center valve is connected to the pump and reservoir. One end of one cylinder and the opposite end of the other cylinder are connected in parallel with the valve by first passage means and the other ends of the cylinders are connected in parallel with the valve by second passage means. First and second orifice means are disposed in the passage means to restrict flow from the cylinders. A pair of one-way valves are connected to the reservoir and to the passage means respectively between the orifices and the cylinders for permitting direct fluid flow from the reservoir to the cylinders.

In another embodiment of my invention the orifices are installed in the four-way open-center valve instead of in the passage means.

Figure 2:
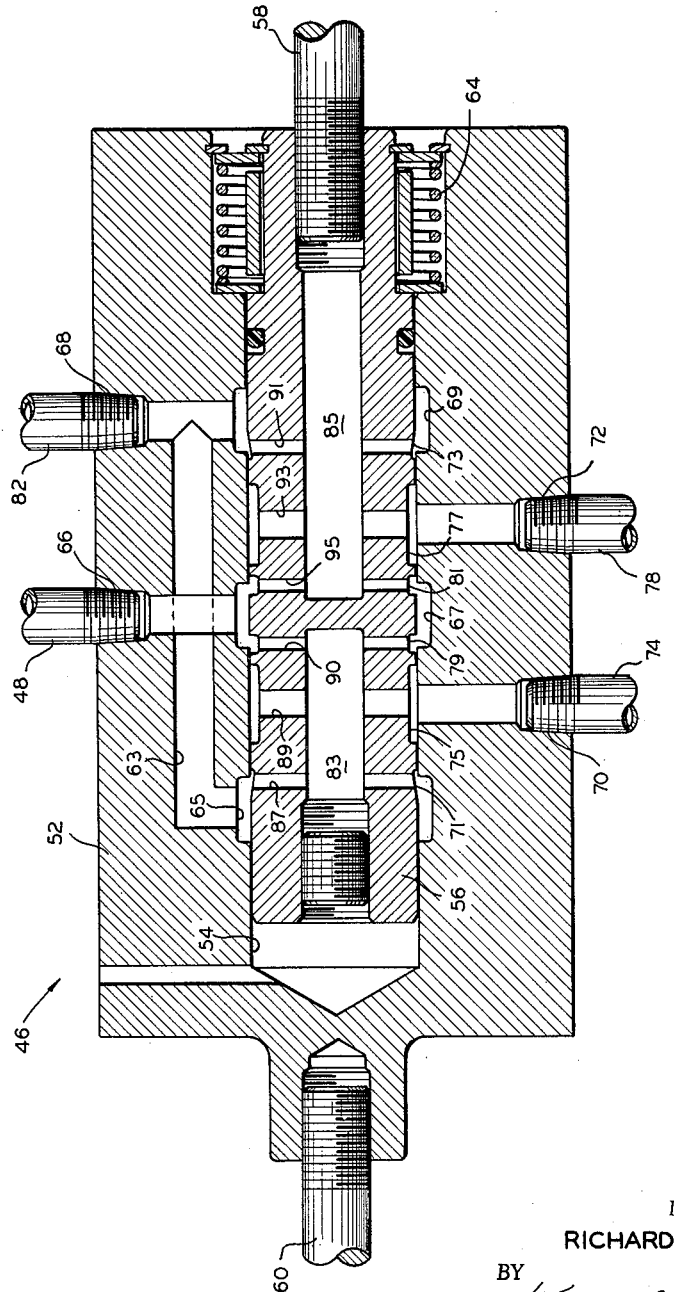

The above objects and other objects, features and advantages of my invention will be more fully comprehended by one versed in the art when the detailed description is read in conjunction with the drawing wherein:

FIGURE 1 is a schematic diagram showing a preferred form of my invention embodied in an articulated fork lift truck, FIGURE 2 is an enlarged cross section of the control valve shown in FIG. 1, and FIGURE 3 is similar to FIG. 2, except that a pair of orifices are included in the valve.

Referring to FIGS. 1 and 2, the reference numeral 10 denotes an articulated fork lift truck shown in phantom, having front and rear frame portions 12 and 14 supported by wheels 16, the front and rear frame portions being pivotally connected at 17 by a combined steering and draft coupling. Attached to the forward and (lower end in FIG. 1) of the front portion 12 is a load engaging means such as a pair of fork arms 18 for engaging and transporting a load. A hitch 20 is mounted at the rearward end of rear portion 14 whereby lift truck 10 may be hitched to another vehicle, such as a conventional highway truck, and towed rearwardly along behind the highway truck.

In order to steer lift truck 10 when it is in operation it is necessary to change the angle between front portion 12 and rear portion 14. This is accomplished by a power steering system designated generally by reference numeral 22. Power steering system 22 includes a pair of double-acting fluid motors or actuators 24 and 26 disposed in parallel, laterally spaced apart relation and connected between front portion 12 and rear portion 14 of fork lift truck 10. The fluid actuators are arranged so that in order to change the angle between the front and rear portions of fork lift truck 10 in one direction one of the fluid actuators pushes while the other pulls, and when it is desired to change the angle between the two portions in the other direction the action of the fluid actuators is reversed, that is, the one that pushed previously now pulls and the one that previously pulled now pushes. Fluid actuator 24 includes a cylinder 28 pivotally connected to rear portion 14, a piston 30 slidably disposed in cylinder 28 for reciprocal movement and a piston rod 32 connected to piston 30 at one end and pivotally connected to front portion 12 at the other end. Fluid actuator 26 similarly includes a cylinder 34, a piston 36 and a piston rod 38.

Also included in power steering system 22 is a fluid reservoir or sump 40 mounted on front portion 12 and a fluid pump 42 likewise mounted on front portion 12 for drawing fluid from rservoir 40 through conduit 44 and supplying it under pressure to a steering control valve 46 by means of a conduit 48. In order to prevent damage to the system by excessive pressures a relief valve 50 is provided which vents back to reservoir 40.

Referring now especially to FIG. 2, it will be apparent that steering control valve 46 is a four-way, open center valve having open cylinder ports. That is, the valve is so arranged that when it is in the neutral position hydraulic fluid flows continuously through the valve from the inlet port to the outlet port without significant restriction. When the valve is moved from the neutral position to an operating position pressure immediately builds up because the fluid is re-directed to a servomotor or similar device and can no longer flow directly to the outlet port, the pressure being dependent upon the resistance that must be overcome to operate the servomotor; and this enables the energy of the pressurized hydraulic fluid to be utilized for operating a servomotor or other device. "Four-way" as used herein has reference to the fact that the valve has four ports. One of these is an inlet port and another is an outlet port, while the other two ports are connected to the servomotor or other device to be operated by the valve. The two ports that are connected to the servomotor or other device are in fluid communication with the inlet and outlet ports in the neutral position of the valve, so that valve is characterized as having "open cylinder ports." Valve 46 includes an elongated valve body 52 having a longitudinally extending bore 54 therein and a valve spool 56 slidably disposed in bore 54.

Valve spool 56 is pivotally connected to rear portion 14 by means of a rod 58 and valve body 52 is connected to the operator's steering wheel (not shown) by means of a rod 60 which is pivotally connected to a pitman arm 62, pitman arm 62 being operatively connected to the steering wheel so that movement of the steering wheel causes movement of the pitman arm. Valve 46 includes a centering spring 64 which is sufficiently strong enough to maintain valve body 52 and valve spool 56 in neutral relation, as shown in FIG. 2, during towing.

Located in valve body 52 are first, second and third longitudinally spaced annular grooves 65, 67 and 69, respectively, in the wall of bore 54. Located in valve body 52 is a fluid inlet port 66 connected to annular groove 67, a fluid outlet port 68 connected to annular groove 69, a fluid passage 63 connecting annular groove 65 with outlet port 68 and a pair of fluid motor actuator ports 70 and 72 disposed intermediate the first and second annular grooves and the second and third annular grooves, respectively. The valve spool 56 includes a first pair of annular grooves 71 and 73 which communicate respectively with grooves 65 and 69, a second pair of annular grooves 75 and 77 inwardly of the first pair and which communicate respectively with ports 70 and 72, and a third pair of annular grooves 79 and 81 inwardly of the second pair of grooves and which both communicate with annular groove 67. Internally of valve spool 56 is a pair of separate chambers 83 and 85. Grooves 71, 75 and 79 are connected to chamber 83 by means of a plurality of passages 87, 89 and 90 respectively. Likewise, grooves 73, 77 and 81 are connected to chamber 85 by passages 91, 93 and 95 respectively. At this point it will be appreciated that when the valve body 52 and valve spool 56 are in the relative position shown in FIG. 2 fluid actuator ports 70 and 72 are in communication both with inlet port 66 and outlet port 68, and also that inlet port 66 is in communication with outlet port 68. Further, as the relative position of valve body 52 and valve spool 56 is shifted away from the neutral position fluid communication between inlet port 66 and one of the fluid motor ports will be progressively cut off while communication between that fluid motor port and the outlet port 68 will be increased. At the same time, fluid communication between the inlet port 66 and the other fluid motor port will be increased while fluid communication between the latter fluid motor port and the outlet port will be progressively decreased.

Fluid motor port 70 is connected to the rod end of cylinder 34 by means of a conduit 74, another conduit 76 connecting the head end of cylinder 28 with conduit 74 so that the opposite ends of cylinders 28 and 34 are connected in parallel. Similarly, the head end of cylinder 34 is connected to fluid actuator port 72 by means of a conduit 78 and the rod end of cylinder 28 is connected in parallel therewith by means of a conduit 80. Also, fluid outlet port 68 is connected with reservoir 40 by means of a conduit 82. Disposed in conduit 74 is an orifice 84 which restricts fluid flow into and out of the rod and head ends of cylinders 34 and 28 respectively. Likewise, an orifice 86 is disposed in conduit 78 and serves to restrict fluid flow into and out of the head and piston rod ends of cylinders 34 and 28, respectively. A conduit 88 in which a one-way check valve 90 is disposed is connected at one end to the reservoir 40 and at the other end to conduit 74 between orifice 84 and cylinder 34 so that direct fluid flow is permitted from the reservoir to the rod end of cylinder 34 and the head end of cylinder 28. Direct fluid flow from reservoir 40 to the rod end of cylinder 28 and the head end of cylinder 34 is provided by a conduit 92 which is connected at one end to conduit 88 and at the other end to conduit 80, a one-way check valve 94 being disposed in conduit 92 for permitting fluid flow from reservoir 40 only.

In order to prevent fluid flow through conduit 48 toward pump 42 a one-way check valve 96 is disposed in conduit 48 so that fluid may flow only from pump 42 toward steering control valve 46. It is necessary to have check valve 96 in this circuit only if pump 42 is of a type, such as a vane pump, that would permit free fluid flow in either direction in a non-operating condition, as would be the case during towing of the lift truck.

Now turning to the operation of my invention, it will be assumed that fork lift truck 10 is attached to a vehicle by means of hitch 20 and is being towed therebehind, and also that pump 42 is not operating. Assume further that wheels 16 have hit an obstruction so that piston 36 moves upwardly in cylinder 34 and piston 30 moves downwardly in cylinder 28, as seen in FIG. 1. It will be obvious at this point that fluid will be forced out of the head and rod ends of cylinders 34 and 28, respectively, under relatively high pressure, through orifice 86 and hence to reservoir 40 via steering control valve 46. At the same time fluid will be drawn into the rod and head ends of cylinders 34 and 28, respectively, under atmospheric pressure directly from reservoir 40 by way of conduit 88 and check valve 90. A similar action takes place when the angle between the front and rear portions of fork lift truck 10 changes in the opposite direction, fluid flowing out of the cylinders through orifice 84 and into the cylinders through conduit 92 and check valve 94. Since fluid flow out of cylinders 28 and 34 is restricted and direct fluid flow into the cylinders from reservoir 40 is provided during towing, the cylinders are maintained full of fluid, and this provides a dampening effect on any oscillation of the fork lift truck during towing.

Thus, it will be seen that the above-described power steering system prevents vehicle oscillation during towing, while permitting the vehicle to articulate normally when being towed around a corner and yet is fully automatic in operation and requires no attention from the operator.

The power steering system as shown in FIGS. 1 and 2 may be modified by omitting orifices 84 and 86 from conduits 74 and 78, respectively, and replacing steering control valve 46, with a similar control valve 98 which is shown in FIG. 3 (like reference numerals being used for like elements). Valve 98 includes a pair of orifices 100 and 102 for restricting fluid flow to and from fluid actuator ports 70 and 72, respectively, in the neutral position. Orifice 100 is formed by a screw 104 which is diametrically disposed in spool 105 and has a cone point which cooperates with a radially extending passage 106 in spool 105 to form orifice 100. Orifice 102 is similarly formed by a screw 108 cooperating with a passage 110 in spool 105. For a more complete description of valve 98 see my copending patent application, Serial No. 174,076, now Patent No. 3,106,938, filed on even date herewith. The advantage of this modification is that under certain conditions of steering operation the restriction to fluid flowing into the fluid actuators 24 and 26 is removed.

The operation of the modified power steering system is identical with the first-described embodiment during towing of the associated vehicle.

The two described embodiments of my invention are intended to be illustrative only, it being clearly understood that numerous changes and modifications may be made to my invention without departing therefrom. Therefore, the scope of my invention is to be determined from the following appended claims as interpreted in light of the prior art.

I claim:

1. In a power steering system having a double-acting piston and cylinder fluid actuator, a fluid reservoir, a pump connected to the reservoir for drawing fluid therefrom, and a steering control valve connected to the pump for receiving pressurized fluid therefrom and to the reservoir for returning fluid thereto, opposite ends of the cylinder being connected to the valve, means for restricting fluid flow from the cylinder and means for permitting fluid flow directly from the reservoir to opposite ends of the cylinder only.

2. A power steering system comprising a double-acting piston and cylinder type fluid motor, a fluid reservoir, a pump connected to said reservoir for drawing fluid therefrom, a steering control valve connected to said pump for receiving pressurized fluid therefrom, the said valve also being connected separately to said reservoir and to opposite ends of said cylinder, a pair of orifice means for restricting fluid flow from said cylinder, and a pair of one-way valve means for permitting fluid flow directly from said reservoir to opposite ends of said cylinder, respectively.

3. A power steering system comprising a double-acting piston and cylinder fluid actuator, a fluid reservoir, a fluid pump connected to said reservoir for drawing fluid therefrom, a four-way open center valve having open cylinder ports and connected between said reservoir and pump, a pair of fluid passages respectively connecting opposite ends of said cylinder to said valve, means disposed respectively in said fluid passages for restricting fluid flow from said cylinder, and means connecting said reservoir and cylinder for permitting fluid flow directly from said reservoir to said cylinder.

4. For use with an articulated vehicle having first and second pivotally connected frame portions, a power steering system comprising a double-acting piston and cylinder fluid actuator, said cylinder being connected to one of said frame portions and said piston being operatively connected to the other of said frame portions, a fluid reservoir, a fluid pump connected to said reservoir for drawing fluid therefrom, a steering control valve connecting said reservoir and said pump, first passage means connecting said valve and one end of said cylinder, second passage means connecting said valve and the other end of said cylinder, a pair of orifice means disposed respectively in said passage means, a pair of valve means connecting respectively opposite ends of said cylinder directly with said reservoir for fluid flow only from said cylinder ends.

5. A power steering system comprising a double-acting piston and cylinder type fluid motor, a fluid reservoir, a pump connected to said reservoir for drawing fluid therefrom, a steering control valve connecting said pump and said reservoir, a pair of orifice means respectively connecting said valve and opposite ends of said cylinder, and a pair of one-way valve means respectively connecting said reservoir and opposite ends of said cylinder for fluid flow from said reservoir to said cylinder.

6. A power steering system comprising a double-acting piston and cylinder fluid actuator, a fluid reservoir, a fluid pump connected to said reservoir for drawing fluid therefrom, a four-way open center valve having open cylinder ports, and connected to receive fluid from said pump and return it to said reservoir, first passage means for connecting said valve and one end of said cylinder, second passage means for connecting said valve and the other end of said cylinder, a pair of orifice means disposed respectively in said passage means for restricting fluid flow from said cylinder, and a pair of one-way valve means connected to said reservoir and opposite ends of said cylinder, respectively, for permitting fluid to flow directly from said reservoir to said cylinder.

7. A power steering system comprising a double acting piston and cylinder fluid actuator, a fluid reservoir, a fluid pump connected to said reservoir, a four-way open center valve having open cylinder ports, said valve being connected respectively to said reservoir and pump for receiving fluid from said pump and returning it to said reservoir, said cylinder ports being connected respectively to opposite ends of said cylinder, said valve including means for restricting fluid flow from said cylinder, and means for permitting fluid to flow directly from said reservoir to said cylinder.

8. In a power steering system having a double-acting piston and cylinder actuator, a reservoir and a pump connected to the reservoir for drawing fluid therefrom, a steering control valve connected respectively to the pump and reservoir, passage means for connecting opposite ends of the cylinder to said valve, said valve including means for restricting fluid flow from the cylinder and one-way valve means for permitting fluid to flow directly from the reservoir to opposite ends of the cylinder.

9. For use with an articulated vehicle having first and second frame portions pivotally connected by a combined steering and draft coupling, a power steering system comprising a pair of double-acting piston and cylinder fluid actuators respectively disposed adjacent opposite sides of the said pivotal connection between the frame portions, said cylinders being pivotally connected to one of the frame portions, the said pistons being pivotally connected to the other frame portion, a fluid reservoir secured to the vehicle, a fluid pump secured to the vehicle and connected by a conduit to said reservoir for drawing fluid therefrom, an open center steering control valve having a fluid inlet port, a fluid outlet port and a pair of open fluid actuator ports, said inlet port being connected to said pump for receiving fluid therefrom, said outlet port being connected to said reservoir for returning fluid thereto, first fluid passage means for connecting opposite ends of said cylinders in parallel with one of said actuator ports, second fluid passage means for connecting the other ends of said cylinders in parallel with the other of said actuator ports, means for restricting fluid flow from said cylinders, and a pair of one-way valve means connecting said reservoir with said passage means respectively for permitting fluid flow directly from said reservoir to said cylinders.

References Cited in the file of this patent
UNITED STATES PATENTS

| | | |
|---|---|---|
| 2,833,557 | Palmiter | May 6, 1958 |
| 2,887,324 | Jackson | May 19, 1959 |
| 2,914,338 | Kress | Nov. 24, 1959 |